United States Patent
Zhang

(10) Patent No.: US 10,726,243 B2
(45) Date of Patent: Jul. 28, 2020

(54) METHOD AND APPARATUS FOR PROCESSING IMAGE

(71) Applicant: BAIDU ONLINE NETWORK TECHNOLOGY (BEIJING) CO., LTD., Beijing (CN)

(72) Inventor: Yanfu Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 87 days.

(21) Appl. No.: 16/051,092

(22) Filed: Jul. 31, 2018

(65) Prior Publication Data
US 2019/0065826 A1 Feb. 28, 2019

(30) Foreign Application Priority Data
Aug. 25, 2017 (CN) .......................... 2017 1 0742463

(51) Int. Cl.
*G06K 9/00* (2006.01)
*H04L 29/06* (2006.01)

(52) U.S. Cl.
CPC ........ *G06K 9/00268* (2013.01); *H04L 65/604* (2013.01); *H04L 65/608* (2013.01)

(58) Field of Classification Search
None
See application file for complete search history.

(56) References Cited

U.S. PATENT DOCUMENTS

| | | | | |
|---|---|---|---|---|
| 2010/0020172 A1* | 1/2010 | Mariadoss | ....... | G08B 13/19613 348/143 |
| 2011/0069863 A1* | 3/2011 | Ito | ....... | G06K 9/00979 382/100 |
| 2015/0098633 A1* | 4/2015 | Kato | ....... | G06K 9/00288 382/118 |
| 2015/0205995 A1* | 7/2015 | Yamada | ....... | G06K 9/00248 382/118 |
| 2015/0363635 A1* | 12/2015 | Suri | ....... | G06K 9/00268 386/241 |
| 2017/0091570 A1* | 3/2017 | Rao | ....... | G06K 9/00979 |

\* cited by examiner

*Primary Examiner* — Justin P. Misleh
(74) *Attorney, Agent, or Firm* — Marshall, Gerstein & Borun LLP

(57) ABSTRACT

Embodiments of the present disclosure disclose a method and apparatus for processing an image. A preferred embodiment of the method comprises: receiving video data acquired by a web camera and decoding the video data to obtain at least one to-be-processed image containing a face image; determining a face region image in the to-be-processed image; and extracting facial feature information from the face region image, the facial feature information comprising at least one of the following: facial form information, eyebrow information or eye shape information. The embodiment acquires video data by means of a web camera, which ensures the quality of the acquired image, realizes the pre-processing of the to-be-processed image and is useful to improve the accuracy of the subsequent face recognition.

9 Claims, 5 Drawing Sheets

METHOD AND APPARATUS FOR PROCESSING IMAGE

CROSS-REFERENCE TO RELATED APPLICATIONS

This application claims the priority of Chinese Application No. 201710742463.9, filed on Aug. 25, 2017, titled "Method and Apparatus for Processing Image," the entire disclosure of which is incorporated herein by reference.

TECHNICAL FIELD

The present disclosure relates to the field of image processing technology, particularly to the field of image recognition technology, and more particularly to a method and apparatus for processing an image.

BACKGROUND

Face recognition technology is a biometric-based recognition method and a technology that uses inherent physiological or behavioral features of humans which may uniquely identify their identities for authentication. The generalized face recognition technology includes a series of related technologies for constructing a face recognition system, the related technologies including face image acquisition, face localization, face recognition and preprocessing, identity confirmation and identity search. In the narrow sense, the face recognition refers specifically to a technology or system for face recognition or identity search through face. With the progress of science and technology, the face recognition technology has been greatly improved and plays an important role in many fields.

In a practical application, in the face recognition technology, an image including a face may be acquired first, then the image including the face is recognized, and finally a recognition result is acquired. The quality of the image including the face is directly related to the quality of the face recognition result. However, the lenses or cameras in the existing terminals (such as face recognition gate, face recognition attendance machine and face recognition payment machine) with face recognition functions are mostly used in indoor environments or environments with sufficient lights. These lenses or cameras have high requirements for lights, and the quality of images obtained under poor light conditions is low, which directly cause the acquired images including a large number of images that can not be used for the face recognition, thus reducing the accuracy of face recognition

SUMMARY

The object of the embodiment of the present disclosure is to provide a method and apparatus for processing an image so as to solve the technical problems as mentioned in the Background.

In a first aspect, the embodiment of the present disclosure provides a method for processing an image, the method including: receiving video data acquired by a web camera and decoding the video data to obtain at least one to-be-processed image including a face image; determining a face region image in the to-be-processed image; and extracting facial feature information from the face region image, the facial feature information including at least one of: facial shape information, eyebrow information or eye shape information.

In some embodiments, the decoding the video data to obtain at least one to-be-processed image including a face image includes: decoding the video data by a real time streaming transmission protocol to obtain a sequence of image frames; and screening out the at least one to-be-processed image including a face image from the sequence of image frames.

In some embodiments, the extracting facial feature information from the face region image including: enlarging the face region image, and filtering the enlarged face region image to obtain a pre-processed face region image; and determining orientation information of the pre-processed face region image, and fitting a facial feature on the basis of the orientation information to obtain facial feature information.

In some embodiments, the method further comprises: setting parameters of the web camera by the real time streaming transmission protocol.

In a second aspect, the embodiment of the present disclosure provides an apparatus for processing an image, the apparatus includes: a web camera, configured for acquiring video data; and an image processing circuit, configured for decoding a to-be-processed image from the video data and extracting facial feature information from the to-be-processed image including a face image.

In some embodiments, the image processing circuit includes: a data receiving interface, configured for receiving video data sent by the web camera.

In some embodiments, the image processing circuit includes: a hardware decoder, configured for decoding the video data to obtain at least one to-be-processed image including a face image.

In some embodiments, the hardware decoder includes: a decoding module, configured for decoding the video data by a real time streaming transmission protocol to obtain a sequence of image frames; and a to-be-processed face image screening module, configured for screening out the at least one to-be-processed image including a face image from the sequence of image frames.

In some embodiments, the image processing circuit includes: a face region detection module, configured for determining a face region image in the to-be-processed image.

In some embodiments, the image processing circuit includes: an image enlarging module, configured for enlarging the face region image, and filtering the enlarged face region image to obtain a pre-processed face region image; and a facial feature information extraction module, configured for determining orientation information of the pre-processed face region image, and fitting a facial feature on the basis of the orientation information to obtain facial feature information.

In some embodiments, the image processing circuit further comprises: a parameter setting module, configured for setting parameters of the web camera.

In a third aspect, the embodiment of the present disclosure includes a server, including: a web camera, configured for acquiring video data; an image processing circuit, configured for processing the video data to obtain facial feature information; one or more processors; a storage device, configured for storing one or more programs; and a face recognition device, configured for performing a face recognition on the basis of the facial feature information, the one or more programs, when executed by the one or more processors, causing the one or more processors to realize the method for processing an image in the first aspect.

In a forth aspect, the embodiment of the present disclosure provides a computer readable storage medium storing a computer program, where the program, when executed by a processor, realizes the method for processing an image in the first aspect.

With the method and apparatus for processing an image according to the embodiments of the present disclosure, video data is acquired by means of a web camera, which ensures the quality of an acquired image; the video data is then decoded to obtain a to-be-processed image, and facial feature information is extracted from the to-be-processed image including a face image, which realizes the pre-processing of the to-be-processed image and is helpful to improve the accuracy of the subsequent face recognition.

BRIEF DESCRIPTION OF THE DRAWINGS

Other features, objects, and advantages of the present disclosure will become more apparent by reading the detailed description of the non-limiting embodiments with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
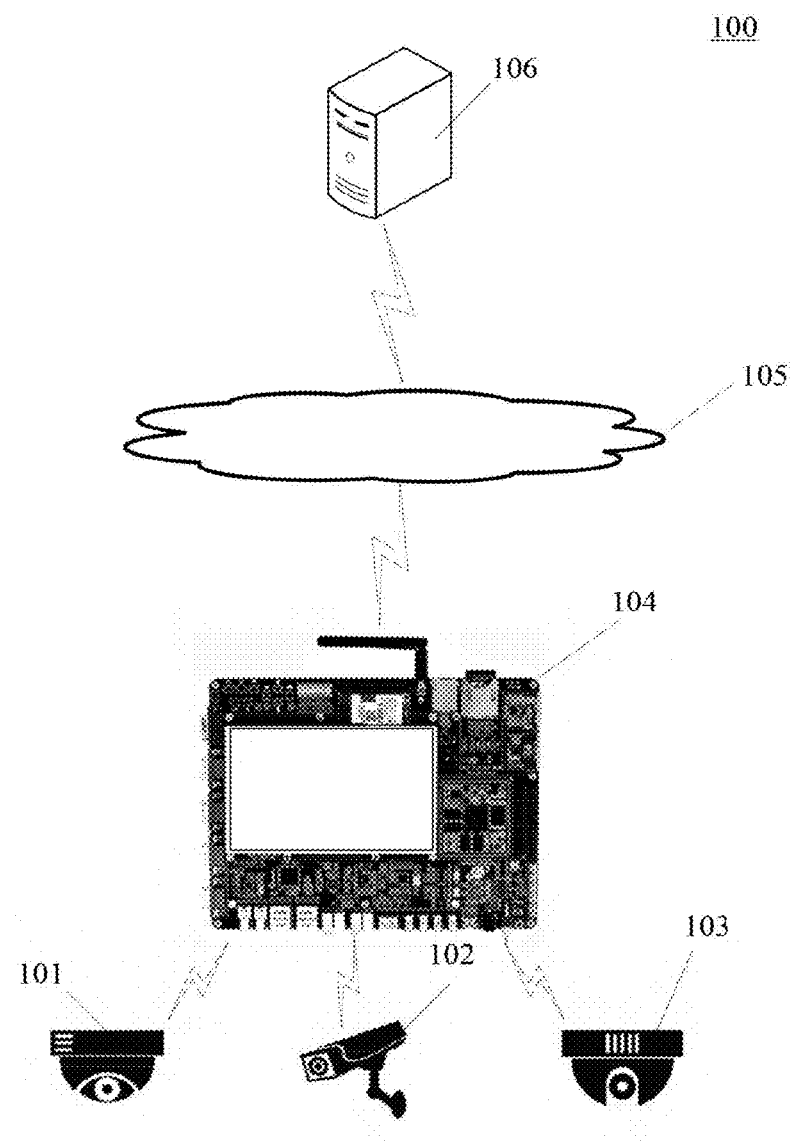
FIG. 1 is an exemplary system architecture to which the present disclosure may be applied.

FIG. 1 shows an exemplary system architecture 100 to which an embodiment of a method for processing an image or an apparatus for processing an image according to the present disclosure may be applied.

As shown in FIG. 1, the system architecture 100 may include web cameras 101, 102 and 103, an image processing circuit 104, a network 105, and a server 106. The web cameras 101, 102 and 103 establish a data connection with the image processing circuit 104 by means of a wired Ethernet. The network 105 is a medium used to provide a communication link between the image processing circuit 104 and the server 106. The network 105 may include various connection types, such as wired and wireless communication links or a fiber optic cable.

The web cameras 101, 102 and 103 may acquire video data and transmit the acquired video data to the image processing circuit 104. The image processing circuit 104 processes the video data, decodes the data to obtain a to-be-processed image including a face image, and then extracts corresponding facial feature information. The image processing circuit 104 sends the facial feature information to the server 106 over the network 105, and the server 106 performs data processing related to face recognition according to the acquired facial feature information. The web cameras 101, 102 and 103 have good light adaptability and may acquire clear video data under different light intensities. The image processing circuit 104 has an interface for data transmission with the web cameras 101, 102 and 103, and may preliminarily process the video data acquired by the web cameras 101, 102 and 103 to obtain corresponding facial feature data. The image processing circuit 104 may set parameters of the web cameras 101, 102 and 103. According to the actual needs, the image processing circuit 104 may also be configured with a hardware decoder, an image processing chip, a data transmitter, a display screen and other devices.

The web cameras 101, 102 and 103 may be various types of web cameras, and the web cameras 101, 102 and 103 may have functions such as zoom, data storage and direction control.

The image processing circuit 104 may be a variety of circuit boards that are used for data decoding and image processing and are provided with displays, including but not limited to single-chip microcomputers and ARM boards.

The server 106 may be a server that processes facial feature information, for example a server that performs processing related to face recognition on the basis of the facial feature information sent from the image processing circuit 104. The server 106 may perform the face recognition based on the facial feature information sent from the image processing circuit 104 to recognize person information in the corresponding to-be-processed image based on the result of the face recognition.

It should be noted that the method for processing an image according to the embodiments of the present disclosure is generally performed by the image processing circuit 104, and accordingly, the apparatus for processing an image is generally disposed in the image processing circuit 104.

It should be understood that the numbers of the web cameras, image processing circuits, networks and servers in FIG. 1 are just indicative. There may be any number of web cameras, image processing circuits, networks and servers according to the implementations needs.

Figure 2:
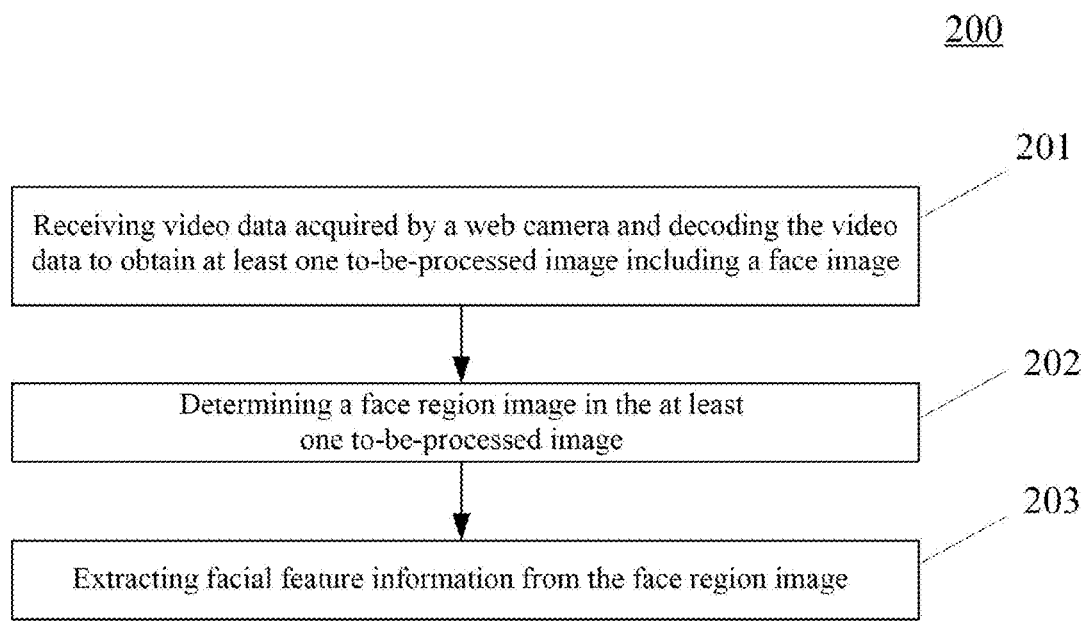
FIG. 2 is a flow chart of an embodiment of a method for processing an image according to the present disclosure.

Reference is further made to FIG. 2 that shows a flow 200 of an embodiment of a method for processing an image according to the present disclosure. The method for processing an image comprises the steps 201 to 203.

Step 201 includes receiving video data acquired by a web camera and decoding the video data to obtain at least one to-be-processed image including a face image.

In the present embodiment, an electronic device (the image processing circuit 104 shown in FIG. 1, for example) to which the method. for processing an image is applied may acquire video data from web cameras 101, 102 and 103 by means of a wired Ethernet connection and process the video data.

The web cameras 101, 102 and 103 have good light adaptability and may acquire high-quality video data at day and night. The web cameras 101, 102 and 103 are widely used in various public places, and play an important role in the fields such as face recognition, authentication, public safety and evidence acquisition.

After acquiring video data, the web cameras 101, 102 and 103 transmit such video data to the image processing circuit 104. After recti gnu the video data, the image processing circuit 104 needs to decode the video data and may decode the video data into multiple images. Then, an image processing chip is used to screen out a to-be-processed image including a face image from the multiple images so as to perform related image processing subsequently.

The image processing circuit 104 according to the present disclosure may be a single-chip computer or an ARM development board, which has a good expandability, and may be arranged to replace or add chips with various functions as required, meeting various processing needs for video data while the cost is low.

In some alternative implementations of the present embodiment, the decoding the video data to obtain at least one to-be-processed image including a face image may including two steps.

The first step includes decoding the video data by a real-time streaming transmission protocol to obtain a sequence of image frames.

The video data may be decoded by the real-time streaming transmission protocol, and the video data may be decoded into a sequence of image frames at an interval of a predetermined time period.

The second step includes screening out at least one to-be-processed image including a face image from the sequence of image frames.

After the video data is decoded into the sequence of image frames, an image including various contents may be obtained. In order to meet the needs of subsequent face recognition, in the present disclosure, the at least one to-be-processed image including a face image may be screened out from the sequence of image frames. Specifically, parameters for image processing may be set in an image processing chip in the image processing circuit 104, to select the relevant parameters of the face image to screen out the face image.

Step 202 includes determining a face region image in the to-be-processed image.

After the to-be-processed image including a face image is obtained, a face region image may be determined from the to-be-processed image by a relevant face recognition method. For example, the to-be-processed image includes a front image of a person, including images of the head, arms and les of the person. The face region image may be determined from the to-be-processed image with a relevant image extraction method.

Step 203 includes extracting facial feature information from the face region image.

After determining the face region image, the image processing chip in the image processing circuit 104 may extract the facial feature information from the face region image according to parameter settings. The facial feature information includes at least one of: facial shape information, eyebrow information or eye shape information, and other facial feature information may be extracted as needed.

In some alternative implementations of the present embodiment, the extracting facial feature information from the face region image may include two steps.

The first step includes: enlarging the face region image, and filtering the enlarged face region image to obtain a pre-processed face region image.

In order to obtain facial feature information, the determined face region image needs to be enlarged after the face region image is determined. Since the definition of the enlarged face region image may decrease, the image processing chip further needs to filter the enlarged face region image to eliminate the noise influence of the enlarged image and obtain a pre-processed face region image.

The second step includes determining orientation information of the pre-processed face region image, and fitting a facial feature on the basis of the orientation information to obtain facial feature information.

The face image in the to-be-processed image may be oriented in multiple directions, and different orientations may result in changes in the facial feature information. Therefore, it is necessary to determine orientation information or the pre-processed face region image first before fitting the facial feature to obtain the facial feature information. The orientation information of the pre-processed face region image is used to represent the orientation of a face. For example, when a person faces the north, the orientation of his/her face points to north. When the face in the to-be-processed image as acquired by the web cameras 101, 102 and 103 does not face the web cameras 101, 102 and 103, the facial feature information of the face may change accordingly. Fitting the facial feature information considering the orientation information may improve the accuracy of the obtained facial feature information. The fitting may be performed by using an exponential function or a logarithmic function or other types of functions, which will not be described in detail here.

In some alternative implementations of the present embodiment, the method according to the present embodiment may further comprise a step of setting parameters of the web camera by the real time streaming transmission protocol.

The image processing circuit 104 may establish a connection with various types of web cameras 101, 102 and 103 and acquire video data acquired by the web cameras 101, 102 and 103. However, the parameters (resolution, data format, image acquisition frequency, illumination parameters, 3D effects and other parameters of the video data may be set according to the actual needs) of the web cameras 101, 102 and 103 themselves may be different. Therefore, parameters such as resolution, image acquisition frequency, illumination parameters and 3D effects of the video data may be set to facilitate subsequent image processing. For example, by setting corresponding image parameters in the image processing chip, the facial feature information may be extracted without complicated data processing procedures.

Figure 3:
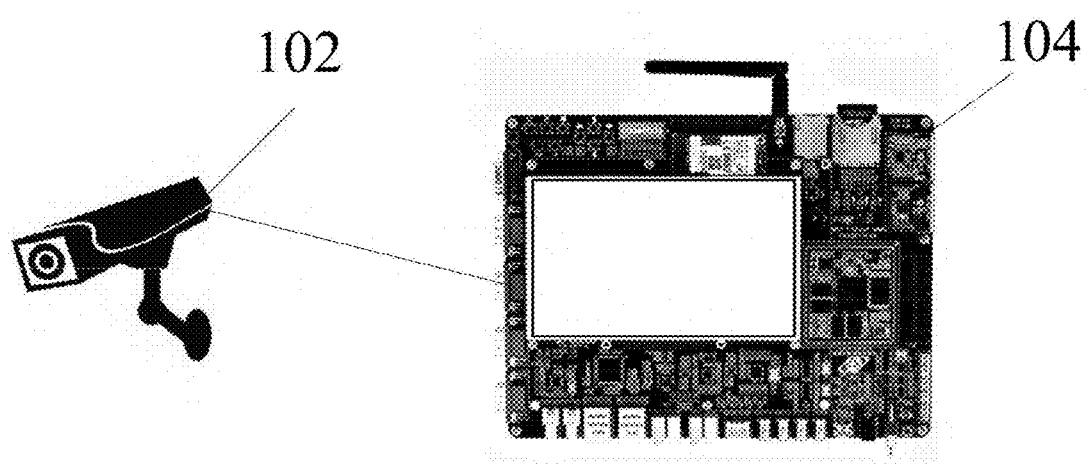
FIG. 3 is a schematic diagram of an application scenario of a method for processing an image according to the present disclosure.

Reference is further made to FIG. 3 that shows a schematic diagram of an application scenario of the method for processing an image according to the present embodiment. In the application scenario in FIG. 3, a web camera 102 sends acquired video data to an image processing circuit 104 after acquiring the video data. After receiving the video data acquired by the web camera 102, the image processing circuit 104 first decodes the video data to obtain a to-be-processed image including a face image, determines a face region image from the to-be-processed image, and extracts facial feature information from the face region image.

According to the method for processing an image according to the embodiments of the present disclosure, video data are acquired by means of a web camera, which ensures the quality of an acquired image; the video data is decoded to obtain a to-be-processed image, and facial feature information is extracted from the to-be-processed image including a face image, which realizes the pre-processing of the to-be-processed image and is helpful to improve the accuracy of the subsequent face recognition.

Figure 4:
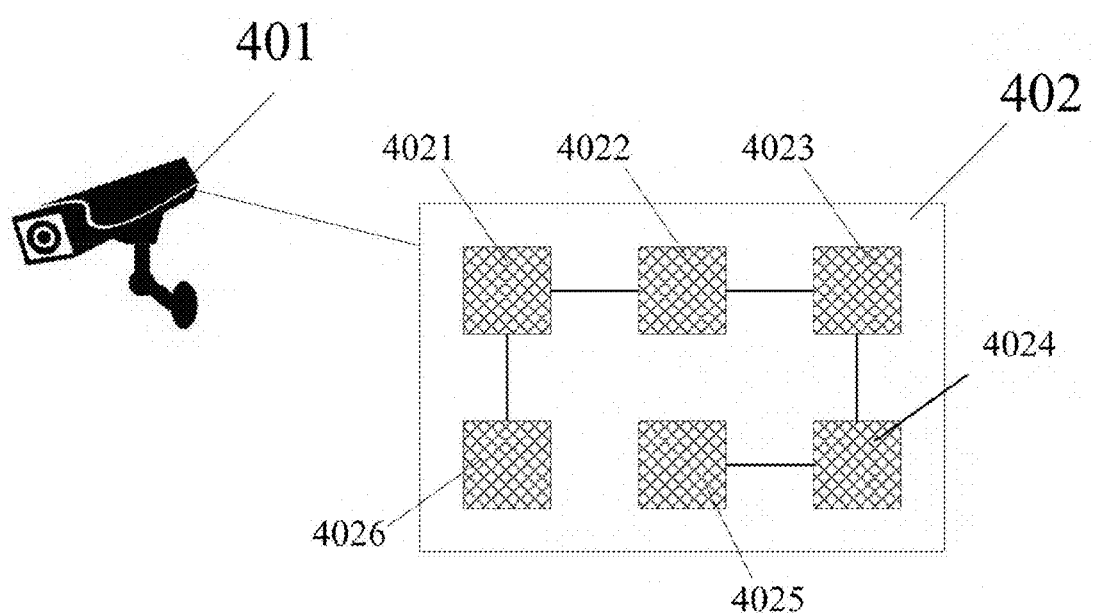
FIG. 4 is a structural diagram of an embodiment of an apparatus for processing an image according to the present disclosure.

Referring further to FIG. 4, the present disclosure provides an embodiment of an apparatus for processing an image as an implementation of the method shown in the figures above. The apparatus embodiments correspond to the method embodiments shown in FIG. 2, and the apparatus may be specifically applied to various electronic devices.

As shown in FIG. 4, an apparatus 400 for processing an image according to the present embodiment may include: a web camera 401 and an image processing circuit 402. The web camera 401 is configured for acquiring video data; and the image processing circuit 402 is configured for decoding a to-be-processed image from the video data and extracting facial feature information from the to-be-processed image including a face image.

The web camera 401 according to the present embodiment may be various types of web cameras, and the web camera 401 has a good light adaptability and may acquire clear video data under different light intensities. The image processing circuit 402 has an interface for data transmission with the web camera 401, and may preliminarily process the video data acquired by the web camera 401 to obtain corresponding facial feature data.

In some alternative implementations of the present embodiment, the image processing circuit 402 may include: a data receiving interface 4021, configured for receiving video data sent by the web camera. Alternatively, the data receiving interface 4021 may be RJ45 (Registered Jack) or other existing network interface or network interface that is possible used in future, which will not be described in detail here.

In some alternative implementations of the present embodiment, the image processing circuit 402 may include: a hardware decoder 4022, configured for decoding the video data to obtain at least one to-be-processed image including a face image.

The format of video data acquired by the web camera 401 may have various types, and the image needs to be processed later, which requires decoding the video data. When the video data is decoded, the video data needs to be decoded according to the format thereof, and the to-be-processed image including a face image is screened out from the decoded video data. In the present embodiment, the hardware decoder 4022 decodes the video data, which not only speeds up the decoding, but also saves computing resources of a processor and is beneficial to the subsequent image processing.

In some alternative implementations of the present embodiment, the hardware decoder 4022 may include: a decoding module (not shown) and a to-be-processed face image screening module (not shown). The decoding module is configured for decoding the video data by a real time streaming transmission protocol to obtain a sequence of image frames; and the to-be-processed face image screening module is configured for screening out at least one to-be-processed image including a face image from the sequence of image frames.

The decoding module may decode the video data into a sequence of image frames according to the format of the video data. The sequence of image frames is generally composed of images at an interval of a predetermined time period. After that, the to-be-processed face image screening module may screen out various kinds of information from the image according to the settings. In the present embodiment, the to-be-processed face image screening module may screen out at least one to-be-processed image including a face image from the sequence of image frames automatically according to the set parameters.

In some alternative implementations of the present embodiment, the image processing circuit 402 may include: a face region detection module 4023, configured for determining a face region image in the to-be-processed image.

After obtaining the to-be-processed image including a face image, the face region detection module 4023 may determine a face region image in the to-be-processed image according to the structure, position, color and other features of the face.

In some alternative implementations of the present embodiment, the image processing circuit 402 may include: an image enlarging module 4024 and a facial feature information extraction module 4025. The image enlarging module 4024 is configured for enlarging the face region image, and filtering the enlarged face region image to obtain a pre-processed face region image; and the facial feature information extraction module 4025 is configured for determining orientation information of the pre-processed face region image, and fitting a facial feature on the basis of the orientation information to obtain facial feature information.

The image enlarging module 4024 may receive the face region image from the face region detection module 4023 and enlarge and filter the face region image to obtain a clear pre-processed face region image. Then, the facial feature information extraction module 4025 may receive the pre-processed face region image, determine orientation information of the pre-processed face region image according to the orientation of a face in the pre-processed face region image, and fit a facial feature on the basis of the orientation information to obtain facial feature information of the face region image. The fitting may be performed with an exponential function or a logarithmic function or may be performed with other types of functions, which will not be described in detail here.

In some alternative implementations of the present embodiment, the image processing circuit 402 may further include: a parameter setting module 4026, configured for setting parameters of the web camera.

According to the descriptions above, the web camera 401 may be various types of cameras, and the web camera 401 may have various data formats, illuminance and other parameters. According to the actual needs, these parameters may be set in order to obtain high-quality video data, which is a necessary premise for ensuring the accuracy of the subsequent face recognition. For example, the parameters of the web camera 401 may be set as: the image pixel being not less than 2 million; a H.264 coding format with high compression ratio being used; wide dynamic function being supported and being not less than 120 db; the focal length of the lens ranging from 2.7 mm to 6 mm; and the minimum illuminance is 0.001 lumens or more (color mode).

In addition, the apparatus 400 for processing an image may also include a display and a device such as an interface for data transmission with a server 106, and specifically the apparatus 400 for processing an image may be expanded as required.

The present embodiment also provides a server, including: a web camera, configured for acquiring video data; an image processing circuit, configured for processing the video data to obtain facial feature information; one or more processors; a storage device, configured for storing one or more programs; and a face recognition device, configured for performing a face recognition on the basis of the facial feature information. The one ore more programs, when executed by the one or more processors, cause the one or more processors to realize the method for processing an image.

The present embodiment also provides a computer readable storage medium storing a computer program, the program, when executed by the processor, achieves the method for processing an image.

Figure 5:
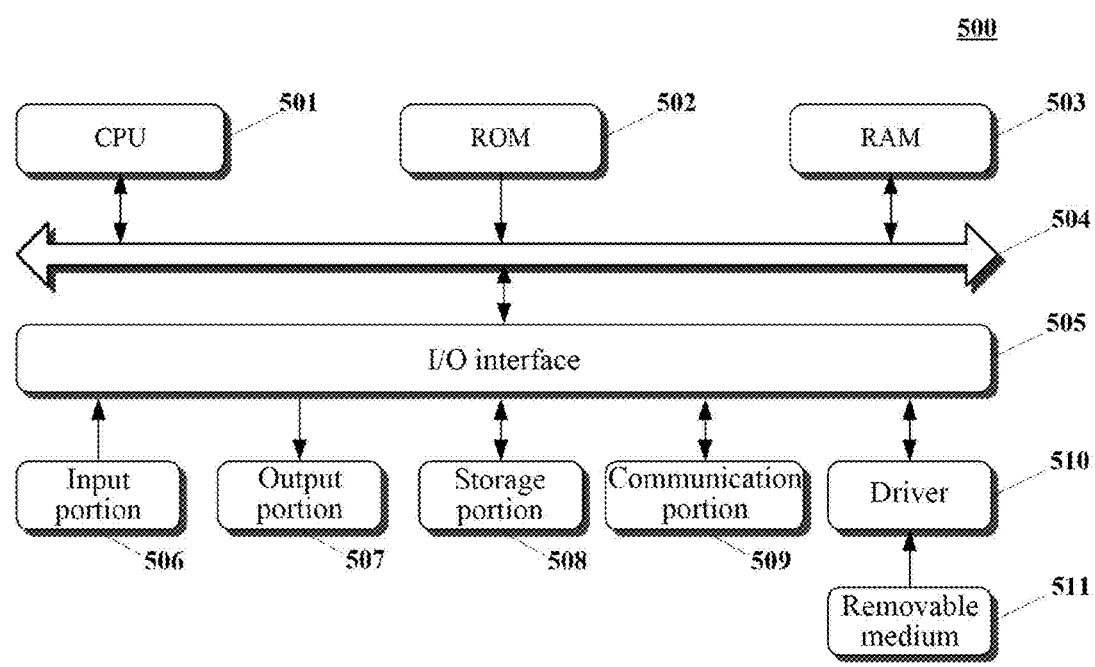
FIG. 5 is a structural diagram of a computer system of a server for realizing the embodiments of the present disclosure.

Referring to FIG. 5, a schematic structural diagram of a computer system 500 adapted to implement a server of the embodiments of the present disclosure is shown. The server shown in FIG. 5 is only an example, and should not be a limitation to the embodiment of the disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 including a cathode ray tube (CRT), a liquid crystal display device (LCD), a speaker etc.; a storage portion 508 including a hard disk and the like; and a communication portion 509 including a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

In another aspect, the present disclosure further provides a computer-readable medium. The computer-readable medium may be the computer-readable medium included in the apparatus in the above described embodiments, or a stand-alone computer-readable storage medium not assembled into the apparatus. The computer-readable medium stores one or more programs. The one or more programs, when executed by a device, cause the device to: receive video data acquired by a web camera and decode the video data to obtain at least one to-be-processed image including a face image; determine a face region image in the to-be-processed image; extract facial feature information from the face region image, the facial feature information includes at least one of face shape information, elbow information, or eye shape information.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for processing an image, comprising:
receiving video data acquired by a web camera;
decoding the video data to obtain at least one to-be-processed image comprising a face image;
determining a face region image in the at least one to-be-processed image; and
extracting facial feature information from the face region image, the facial feature information comprising at least one of facial shape information, eyebrow information, or eye shape information;
wherein the extracting facial feature information from the face region image comprises:
enlarging the face region image;
filtering the enlarged face region image to obtain a pre-processed face region image;
determining orientation information of the pre-processed face region image; and
fitting a facial feature on the basis of the orientation information to obtain the facial feature information.

2. The method according to claim 1, wherein the decoding the video data to obtain at least one to-be-processed image comprising a face image comprises:
decoding the video data by a real time streaming transmission protocol to obtain a sequence of image frames; and
screening out the at least one to-be-processed image comprising the face image from the sequence of image frames.

3. The method according to claim 1, further comprising:
setting parameters of the web camera by a real time streaming transmission protocol.

4. An apparatus for processing an image, comprising:
a web camera, configured for acquiring video data; at least one processor; and
a memory storing instructions, the instructions when executed by the at least one processor, cause the at least one processor to perform operations, the operations comprising:
receiving, via the web camera, the video data;
decoding the video data to obtain a to-be-processed image;
determining a face region image in the to-be-processed image; and
extracting facial feature information from the face region image, wherein the facial feature information comprises at least one of facial shape information, eyebrow information, or eye shape information;
wherein the extracting facial feature information from the face region image comprises:
enlarging the face region image;
filtering the enlarged face region image to obtain a pre-processed face region image;
determining orientation information of the pre-processed face region image; and
fitting a facial feature on the basis of the orientation information to obtain the facial feature information.

5. The apparatus according to claim 4, further comprising:
a data receiving interface, coupled to the at least one processor, configured for receiving the video sent by the web camera.

6. The apparatus according to claim 4, further comprising:
a hardware decoder, coupled to the at least one processor, configured for decoding the video data to obtain the to-be-processed image.

7. The apparatus according to claim 6, wherein the decoding the video data to obtain the to-be-processed image comprises:
decoding the video data by a real time streaming transmission protocol to obtain a sequence of image frames; and
screening out the to-be-processed image from the sequence of image frames.

8. The apparatus according to claim 4, wherein the operations comprise:
setting parameters of the web camera.

9. A non-transitory computer medium storing a computer program, wherein the program when executed by a processor causes the processor to perform operations, the operations comprising:
receiving video data acquired by a web camera;
decoding the video data to obtain at least one to-be-processed image comprising a face image;
determining a face region image in the at least one to-be-processed image; and
extracting facial feature information from the face region image, the facial feature information comprising at least one of facial shape information, eyebrow information, or eye shape information;
wherein the extracting facial feature information from the face region image comprises:
enlarging the face region image;
filtering the enlarged face region image to obtain a pre-processed face region image;
determining orientation information of the pre-processed face region image; and
fitting a facial feature on the basis of the orientation information to obtain the facial feature information.

* * * * *